United States Patent [19]

Fazis

[11] Patent Number: 4,838,725
[45] Date of Patent: Jun. 13, 1989

[54] DRIVING UNIT FOR MANDRELS AND THE LIKE

[75] Inventor: Hermann Fazis, Weil am Rhein, Fed. Rep. of Germany

[73] Assignee: Ludwig Boschert GmbH & Co. KG, Lörrach-Hauingen, Fed. Rep. of Germany

[21] Appl. No.: 159,078

[22] Filed: Feb. 23, 1988

[30] Foreign Application Priority Data

Feb. 26, 1987 [DE] Fed. Rep. of Germany ....... 3706166

[51] Int. Cl.$^4$ .............................................. B25G 3/18
[52] U.S. Cl. ..................................... 403/322; 403/341; 242/68.4; 464/182
[58] Field of Search ............... 403/341, 316, 317, 315, 403/330, 322; 242/68.4, 68.1; 464/182, 185, 106

[56] References Cited

U.S. PATENT DOCUMENTS

| | | | |
|---|---|---|---|
| 3,147,985 | 9/1964 | Hornberger | 242/68 |
| 3,854,830 | 12/1974 | Kornberger | 403/330 X |
| 4,344,304 | 8/1982 | Kunz | 464/85 |
| 4,460,134 | 7/1984 | Kunz | 242/68.4 |
| 4,551,117 | 11/1985 | Kunz | 464/106 |
| 4,758,113 | 7/1988 | Kunz | 403/341 |

FOREIGN PATENT DOCUMENTS

| | | |
|---|---|---|
| 917592 | 9/1954 | Fed. Rep. of Germany . |
| 3127553 | 11/1983 | Fed. Rep. of Germany . |
| 3509108 | 9/1986 | Fed. Rep. of Germany . |

Primary Examiner—Andrew V. Kundrat
Attorney, Agent, or Firm—Peter K. Kontler

[57] ABSTRACT

A driving unit which can transmit torque to one end portion of a driven part, such as mandrel or a spindle for convoluted textile or other material, has a rotary driving member one end portion of which has a socket for the one end portion of the driven part and carries a wheel-shaped confining member which is pivotable on the driving member between an operative position in which it prevents removal of the end portion of the driven part and an inoperative position in which the end portion of a driven part can be inserted into or removed from the socket. The confining member is pivotable by a toggle joint which is partially recessed into the driving and/or confining member and is actuatable by a motor and a spring. The spring biases the links of the joint to positions in which the confining member assumes the operative position, and the motor can be actuated to pivot the links in a direction to move the confining member to the inoperative position. The action of the motor upon the links of the toggle joint can be assisted by an attendant who pushes or pulls the confining member to its inoperative position.

20 Claims, 2 Drawing Sheets

DRIVING UNIT FOR MANDRELS AND THE LIKE

CROSS-REFERENCE TO RELATED CASE

The driving unit of the present invention is similar to that which is disclosed in the copending patent application Ser. No. 014,938 filed Feb. 13, 1987 now U.S. Pat. No. 4,758,113 by Wolfgang Kunz for "Coupling for winding and unwinding mandrels or the like".

BACKGROUND OF THE INVENTION

The invention relates to driving units which can be used to rotate shafts, axles, cores, spindles, winding and unwinding mandrels and/or other rotary driven parts. More particularly, the invention relates to driving units of the type wherein a rotary driving member (e.g., a motor-driven shaft) rotates a confining member (e.g., in the form of a wheel) which is pivotable relative to the driving member between an operative position in which the two members cooperate to locate and rotate a driven part and an inoperative position in which the driven part can be removed, detached or withdrawn from torque-receiving engagement with the driving and confining members.

Driving units of the above outlined character are disclosed, for example, in the aforementioned copending patent application Ser. No. 014,938 as well as in German Pat. No. 35 09 108 to Boschert. The patent to Boschert discloses a driving unit wherein the confining member is releasably held in the operative position by a pawl which is pivotably mounted on the confining member and has a pallet arranged to enter a notch in the driving member to be held in such position by a coil spring. An advantage of this driving unit is that the confining member is reliably held in the operative position, even if the driving member is to transmit torque to a heavy and bulky driven part, e.g., to a mandrel or spindle which carries a large supply of convoluted textile or other material. All that is necessary is to employ a relatively strong spring which can oppose movements of the pawl to disengaged position with a requisite force, namely to withstand the action of centrifugal force when the driving unit is in use so that the driving and confining members cooperate to ensure the transmission of torque to a driven part. In order to save space, as well as to ensure that the pawl cannot be accidentally disengaged from the driving member when the latter is rotated to transmit torque to a driven part, the pawl is normally placed within the confining member so that it does not protrude beyond the outline of the confining member when the driving member rotates. The arrangement is such that the force which is required to disengage the pallet of the pawl from the driving member must be supplied practically exclusively by the fingers of the operator, i.e., the fingers must overcome the resistance which the aforementioned spring offers to movement of the pallet to disengaged position. The patent to Boschert does not disclose or suggest any means for mechanically moving the pawl to and from the position of engagement with the driving member. In fact, it would be rather difficult to devise acceptable disengaging means which would not extend well beyond the outline of the wheel-shaped confining member. The outwardly protruding disengaging means would be likely to be actuated by a careless person while the driving unit is in use, to injure a person standing next to the driving unit and/or to interfere with the operation of a lifting mechanism which is employed to transfer heavy and bulky driven parts into and from engagement with the driving and confining members.

German Pat. No. 31 27 553 to Kunz discloses a modified driving unit with an auxiliary device serving to move the confining member to and from operative position. A drawback of such auxiliary device is that it projects well beyond the outlines of the driving an confining members so that the operators must exercise great care during insertion of a driven part into or during withdrawal of a driven part from the socket of the driving member. It has been found that the loading and unloading mechanism is likely to damage the auxiliary device which is used to move the confining member between its operative and inoperative positions.

Additional driving units are disclosed in German Pat. No. 917,592 to Fazis (this patent does not disclose any means for moving the confining member to its inoperative position), in U.S. Pat. No. 4,344,304 to Eiche (which discloses cushions and centering means for the driven part), in U.S. Pat. No. 4,460,134 to Kunz (which discloses a mechanism for adjusting a portion of the reeling shaft), and in U.S. Pat. No. 3,147,985 to Hornberger (this patent discloses a driving chuck wherein the socket for an end portion of a spindle is designed to automatically guide the end portion to an optimum position for reception of torque from the driving member).

OBJECTS AND SUMMARY OF THE INVENTION

An object of the invention is to provide a driving unit or driving chuck which is constructed and assembled in such a way that it can offer a pronounced resistance to movements of the confining member from its operative position and wherein the confining member can be rapidly moved to inoperative position by a mechanism which does not interfere with the transfer of a driven part to and from the torque-receiving position.

Another object of the invention is to provide novel and improved means for moving the confining member relative to the driving member.

A further object of the invention is to provide novel and improved means for releasably locking the confining member in its operative position with reference to the driving member.

An additional object of the invention is to provide the driving unit with novel and improved means for unlocking and moving the confining member with reference to the driving member.

Still another object of the invention is to provide a driving chuck which can be used with advantage for the transmission of torque to lightweight or heavy or extremely heavy and bulky driven parts, such as mandrels or spindles carrying large quantities of convoluted textile or other material.

An additional object of the invention is to provide a driving unit wherein the means for moving the confining member relative to the driving member does not interfere with the loading or unloading of driven parts, and wherein such moving means cannot accidentally release the driven part when the driving unit is in use.

Another object of the invention is to provide a driving unit wherein the means for receiving a driven part is automatically moved to an optimum position when the unit is ready to receive a fresh driven part or to be relieved of a driven part.

The improved driving unit can be used to rotate spindles, cores, mandrels and/or other rotary driven parts, e.g., to rotate a mandrel in a direction to wind filamentary material onto or to pay out filamentary material from the mandrel. The driving unit comprises a rotary driving member (e.g., a substantially horizontal motor-driven shaft) which is rotatable in a suitable support about a first axis, a rotary confining member (e.g., a wheel), and a torque transmitting device (e.g., the pintle of a hinge) which is provided on the driving member and defines for the confining member a pivot axis which is disposed at one side of and extends substantially at right angles to the first axis. The confining member is movable relative to the driving member about the pivot axis between a first position of substantial coaxiality with the driving member and a second position in which the axis of the confining member is inclined relative to the first axis. The driving unit further comprises means for moving the confining member between its first and second positions. The moving means comprises a toggle joint which is remote from the torque transmitting device and includes a first link pivoted to the driving member, a second link pivoted to the confining member and to the first link, and means for pivoting the links relative to each other and relative to the respective members.

The driving member can comprise means (e.g., a socket which has a polygonal cross-sectional outline) for transmitting rotary motion to a driven part, and such motion transmitting means is accessible to permit insertion of a portion of a driven part thereinto, or to permit extraction or withdrawal of such portion of a driven part therefrom, in the second position of the confining member.

The toggle joint is preferably located at the other side of the first axis, i.e., opposite the torque transmitting means), and the confining member is preferably provided with a recess (e.g., a recess whose cross-sectional area increases in a direction toward the first link) which receives a portion at least of the second link.

The pivoting means can include means for releasably locking the confining member in the first position; such locking means can comprise a coil spring or other suitable means for yieldably biasing the links to positions which correspond to the first position of the confining member.

The toggle joint further comprises a first pivot which connects the first link to the driving member, a second pivot which connects the second link to the confining member (preferably in the aforementioned recess of the confining member), and a third pivot which is preferably parallel to the first and second pivots and to the torque transmitting device and connects the links to each other. The third pivot is preferably remote from and is disposed at one side of a straight line connecting the axes of the first and second pivots when the confining member assumes its second position, and the third pivot is preferably nearer to the straight line in the first position of the confining member (the third pivot is then preferably located at the other side of the straight line, i.e., the toggle joint must move through and beyond a dead center position (in which the axis of the third pivot is coplanar with the axes of the first and second pivots) during movement of the confining member from one to the other of its positions).

The driving unit preferably further comprises abutment means on one of the members (e.g., an adjustable stop on the driving member) for preventing a pivoting of the links beyond those positions which correspond to the first position of the confining member.

The pivoting means can comprise a reciprocable output or push-pull element which is attached to one of the links, e.g., to an extension of the first link.

The driving member can be provided wit a chamber for the pivoting means (or at least for the output element of the pivoting means), and the pivoting means preferably further comprises means (such as the aforementioned locking spring) for yieldably biasing the output element in a direction to move the confining member to its first position through the medium of the links, and means (e.g., a motor, preferably a fluid-operated motor) for moving the output element against the opposition of the biasing means in a direction to pivot the confining member to its second position by way of the links. The motor can comprise a reciprocable component (e.g., a piston rod) which is substantially coaxial with the output element and is operative to move the output element in a direction to pivot the confining member to its second position through the medium of the links.

The chamber of the driving member can comprise or receive a retainer (e.g., an internal shoulder), and the biasing means can react against such retainer to bear against a collar or another suitable stop on the output element in a direction to urge the output element toward a position in which the confining member is releasably locked in the first position.

One of the links can comprise two spaced-apart sections which flank the other link, and the aforementioned third pivot serves to articulately connect the two sections of the one link to each other and to the other link.

The driving member can be rotatably mounted in a stationary support, and the pivoting means can include a first portion (such as the aforementioned links and the output element) which is mounted on the driving member, and a second portion (such as the aforementioned motor) which is mounted on the support so that the first portion of the pivoting means registers with the second portion in a predetermined angular position of the driving member relative to the support. The output element can assume a vertical or nearly-vertical position when the driving member assumes the predetermined angular position relative to the support, and the second portion of the pivoting means is preferably located at a level below the first portion so that a reciprocable component (e.g., a piston rod) of the motor must be caused to move upwardly in order to shift the output element in a direction to pivot the confining member to the second position through the medium of the links.

The confining member can be provided with a second socket or an analogous portion which receives or engages a second portion of a mandrel or another driven part when a first portion of such driven part is received in the socket of the driving member. The arrangement is preferably such that the second socket is moved away from the respective portion of the driven part when the confining member is pivoted to second position so that the driven part is then free to leave the socket of the driving member to be reinserted at a later time or to be replaced with another driven part.

The novel features which are considered as characteristic of the invention are set forth in particular in the appended claims. The improved driving unit itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
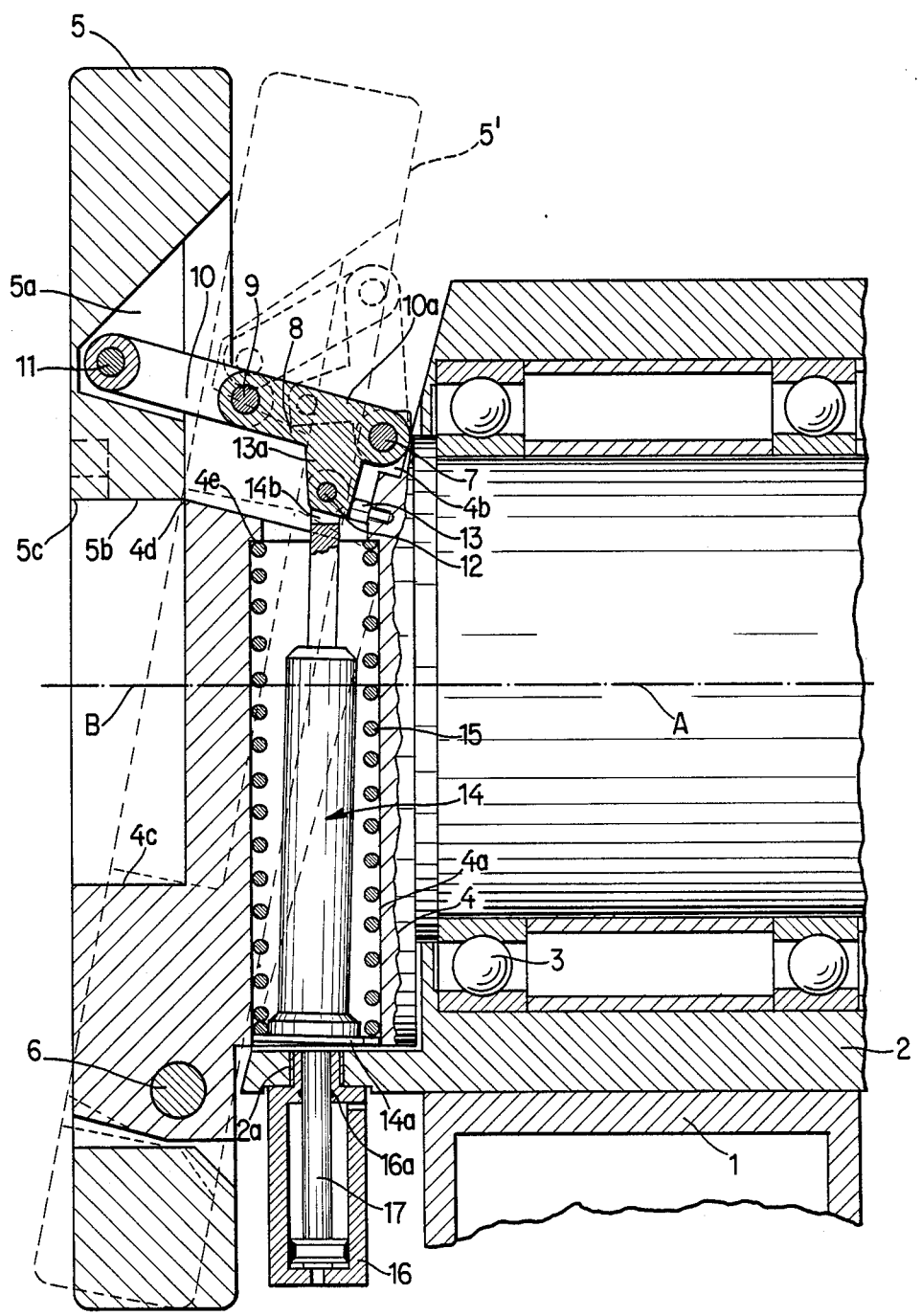
FIG. 1 is a partly side elevational and partly axial sectional view of a driving unit which embodies one form of the invention, the second or inoperative position of the confining member being indicated by broken lines.
Figure 2:
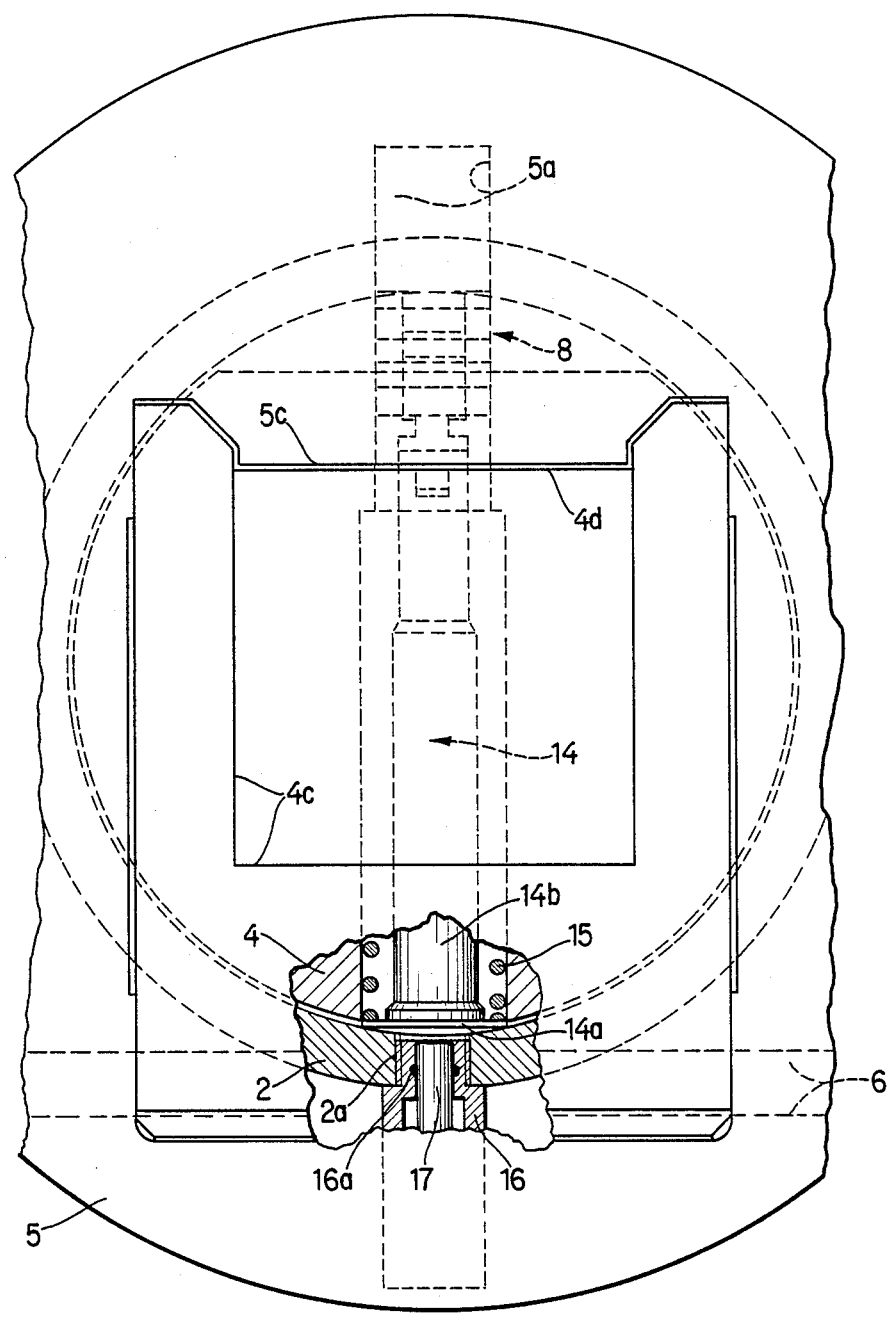
FIG. 2 is an end elevational view as seen from the left-hand side of FIG. 1, with portions of the driving and confining members broken away to expose a portion of the moving means.

FIGS. 1 and 2 shows a driving unit or driving chuck wherein the frame 1 of a machine carries a stationary support 2 for one or more antifriction bearings 3 surrounding a rotary driving member 4 in the form of a horizontal shaft whose axis of rotation is shown at A. The left-hand end portion (as seen in FIG. 1) of the driving member 4 carries a torque transmitting device 6 in the form of a pintle which pivotally connects the member 4 with a rotary wheel-shaped confining member 5. The latter is compelled to share all angular movements of the driving member 4 about the axis A and is pivotable relative to the member 4 about a pivot axis (defined by the pintle 6) so that it can move between a first or operative position which is shown in FIG. 1 by solid lines and a second or inoperative position 5' which is shown in FIG. 1 by broken lines. When it assumes the first position, the axis B of the confining member 5 coincides with the axis A of the driving member 4.

The left-hand end face of the driving member 4 (as seen in FIG. 1) has a polygonal motion transmitting socket 4c, and the left-hand end face of the confining member 5 has a complementary socket 5b. When the driving member 4 is idle and is held in the angular position of FIGS. 1 and 2 (in which the axis of the pintle 6 is horizontal and is located at a level below the axis A of the driving member 4), the socket 4c of the driving member 4 is open from above and the confining member 5 is pivotable about the axis of the pintle 6 from the solid-line position to the broken-line position 5' to thereby permit insertion of a first portion of a driven part (such as a mandrel or spindle which is to be rotated by the members 4, 5 when the driving unit is in use) from above. At such time, the edge 5c in the socket 5b of the confining member 5 is located close to or to the right of the edge 4d of the driving member 4 so that the confining member 5 (in the position 5') exposes the upper side of the socket 4c. When the end portion of a driven part is properly received in the socket 4c of the driving member 4, the confining member 5 is pivoted back to the solid-line position of FIG. 1 so that its socket 5b overlies the upper portion of the respective end of the properly inserted driven part and the members 4, 5 cooperate to reliably rotate the driven part as soon as the motor (not shown) which serves to rotate the driving member 4 is started. The socket 4c of the driving member 1 can have a substantially square, rectangular or other polygonal or in part polygonal outline. All that counts is to ensure that the driven part whose one end is received in the sockets 4c, 5b is compelled to rotate with the driving member 4 when the confining member 5 is held in the solid-line position of FIG. 1. The entire socket of the confining member 5 can constitute a flat surface (5b) which overlies the open side of the socket 4c when the driving unit is ready to rotate a properly inserted driven part. At such time, the edge 5c of the confining member 5 is or can be flush with the exposed end face of the driving member 1. The heretofore described parts of the driving unit are similar or analogous to those described in the aforementioned German Pat. No. 917,592 to Fazis.

The means for moving the confining member 5 relative to the driving member 4 comprises a toggle joint 8 which is disposed between the members 4, 5. As can be seen in FIG. 1, the pintle 6 is disposed at one side and the toggle joint 8 is disposed at the other side of the axis A of the driving member 1. The joint 8 comprises a first link 10a which is movably connected to the driving member 4 by a first pivot 7 in a recess 4b of the member 1, a second link 10 which is movably connected to the confining member 5 by a second pivot 11, a third pivot 9 whose axis is parallel to the axes of the pivots 7, 11 and pintle 6 and which articulately connects the links 10a, 10 to each other, and a device 14 which serves to pivot the links 10a, 10 relative to each other and relative to the members 4, 5 in order to move the confining member 5 between the solid-line and broken-line positions of FIG. 1. At least a portion of the link 10 is received in a recess 5a provided in that side of the confining member 5 which faces the link 10a. The cross-sectional area of the recess 5a preferably increases in a direction toward the pivot 7 and link 10a so as to ensure that the entire link 10 and a portion at least of the pivot 9 can be accommodated in this recess when the confining member 5 is moved to the broken-line (second) position 5'. The pivot 9 is located at the outer side of and is remote from an imaginary straight line which connects the axes of the pivots 7, 11 when the confining member 5 is held in the broken-line position 5', and the pivot 9 is nearer to the just mentioned line and is located at the inner side of such line (i.e., nearer to the axis A) when the confining member 5 is held in the solid-line position of FIG. 1. This ensures that the links 10a, 10 of the toggle joint 8 must move beyond a dead-center position (in which the axis of the pivot 9 is coplanar with the axes of the pivots 7, 11) when the confining member 5 is caused to move from the solid-line position to the position 5' or vice versa. The pivot 11 is located radially outwardly of the socket 5b of the confining member 5. In order to prevent a pivoting of the links 10a, 10 beyond the solid-line positions of FIG. 1, namely in a direction to move the pivot 9 nearer to the axis A, the driving member 1 is provided with a preferably adjustable abutment 13 which is located in the path of movement of an extension 13a of the link 10a to arrest the link 10a (and hence also the link 10 and confining member 5) when the confining member reaches the solid-line position of FIG. 1 on its way from the position 5'.

The device 14 for pivoting the links 10a, 10 comprises a reciprocable push-pull element 14b which can be said to constitute the output element of the device 14 and is received in a substantially diametrically extending chamber 4a of the driving member 4. One end portion of the element 14b is movably connected to the extension 13a by a pivot 12 which is parallel to the pivot 9, and the other end portion of the element 14b has a stop 14a in the form of an annular collar in that end portion of the chamber 4a which is remotest from the links 10a, 10. The chamber 4a has a retainer 4e in the form of an internal shoulder which is engaged by one end convolution of a prestressed coil spring 15 the other end convolution of which bears against the stop 14a and which serves as a means for biasing the confining member 5 to the solid-line position of FIG. 1 through the medium of the links 10a, 10 and element 14b, i.e., to the position in which the extension 13a bears against the abutment 13 of the driving member 4.

It is also within the purview of the invention to design the toggle joint 8 in such a way that the pivot 9 moves radially inwardly beyond the imaginary straight line which connects the axes of the pivots 7, 11 when the confining member 5 is to move to its inoperative position. The illustrated mounting of the toggle joint 8 is preferred at this time because there is more room for the links 10a, 10 and for the pivot 9 radially outwardly of the aforementioned straight line. In addition, it would be necessary to provide a recess in the driving member 4 to accommodate the pivot 9 and the adjacent portions of the links 10a, 10 in the inoperative position (5') of the confining member 5.

The chamber 4a for the output element 14b of the pivoting device 14 is axially offset with reference to the socket 4c and recess 4b of the driving member 4. Such positioning of the chamber 4a contributes to compactness of the driving unit and does not unduly reduce the strength of the driving member 4.

The coil spring 15 can be said to constitute a means for releasably locking the confining member 5 in its operative position with reference to the driving member 4. The resistance of this spring to movement of the confining member 5 from the operative position can be overcome by a moving means in the form of a fluid-operated motor 16 which is mounted on the support 2 at the six o'clock position of the driving member 4 and can be actuated by a gaseous or hydraulic fluid to move the element 14b of the pivoting device 14 axially in a direction to move the links 10a, 10 toward and beyond the dead center positions, i.e., to move the pivot 9 radially outwardly beyond the aforementioned straight line which connects the axes of the pivots 7 and 11. This causes the locking spring 15 to store energy because the stop 14a of the output element 14b moves nearer to the retainer (shoulder) 4e in the chamber 4a. The motor 16 has a cylinder for a piston rod 17 which is reciprocable radially of the driving member 4 and registers with the output element 14b in a single angular position of the driving member 4 relative to the support 2, namely when the axis of the output element 14b is substantially vertical and the open side of the socket 4c in the driving member 4 faces upwardly to permit convenient loading or unloading of driven parts, e.g., by means of an overhead trolley or crane if the driven parts are heavy and bulky. The upper end wall of the cylinder of the motor 16 has an externally threaded cylindrical nipple which is received in a tapped radial bore 2a of the support 2. The upper end wall of the cylinder of the motor 16 further comprises a seal 16a which surrounds the piston rod 17. The cylinder of the motor 16 is a simple single-acting cylinder (i.e., the piston in the cylinder can be lifted by a pressurized fluid which is admitted by way of a port in the bottom end wall of the cylinder) because the spring 15 is free to expand as soon as the lower chamber in the cylinder of the motor 16 is connected with the atmosphere (if the pressurized fluid is air) or with a sump (if the pressurized fluid is oil or another liquid) to return the element 14b to the position of FIG. 1 in which the confining member 5 is releasably locked against movement from the operative position. The locking action of the spring 15 is assisted by centrifugal force when the driving member 4 rotates because the centrifugal force urges the collar 14a of the output element 14b radially outwardly, i.e., the element 14b pulls the pivot 12 toward the axis A of the rotating driving member 4.

It is preferred to design one of the links 10a, 10 as a twin link with two sections which flank the other link and are connected to the other link and to each other by the pivot 9. FIG. 2 shows that the link 10 comprises two sections which flank the link 10a.

The motor 16 can be replaced with other types of means for moving the output element 14b without departing from the spirit of the invention. For example, the illustrated fluid-operated motor 16 can be replaced with a rotary feed screw, an electric motor, an electromagnet, a rack-and-pinion drive, a crank or any other suitable means which can move the output element 14b axially in a direction to change the mutual inclination of the links 10a, 10 and to thereby move the confining member 5 to the inoperative position 5' against the opposition of the locking spring 15. The motor which is employed to pivot the links 10a, 10 against the opposition of the spring 15 should be capable of moving the element 14b through a distance which suffices to ensure that the mutual inclination of links 10a, 10 suffices to move the edge 5c of the confining member 5 to a position of alignment with the edge 4d (or to the right of such position, as seen in FIG. 1) in order to enable an operator or a crane to lift a properly inserted driven part out of the socket 4c or to insert a fresh driven part. In other words, the motor should be capable of reducing the distance between the axes of the pivots 7 and 11 to an extent which is necessary to ensure that the upper portion of the confining member 5 cannot interfere with insertion of driven parts into with or removal of driven parts from the socket 4c. The piston rod 17 is retracted into the cylinder of the motor 16 as soon as the insertion of a fresh driven part into the socket 4c is completed so that the spring 15 is free to releasably lock the properly inserted driven part by moving the confining member 5 to and by holding the confining member in the solid-line position of FIG. 1. The piston rod 17 is then expelled from the chamber 4a of the driving member 4 so that the latter is free to rotate relative to the support 2 and to thereby transmit torque to the confining member 5 and to the driven part in the sockets 4c, 5b. The abutment 13 automatically arrests the links 10a, 10 when the confining member 5 reaches its operative position. This abutment can constitute a screw or a bolt which is adjustable relative to the driving member 4 to thereby select the exact position of the confining member 5 when the latter is to prevent withdrawal, escape or expulsion of a driven part from the socket 4c.

The motor 16 can be operated manually or by remote control, e.g., in response to a signal which is generated by a monitoring device serving to ascertain that the driving member 4 does not rotate and has assumed the required angular position with reference to the support 2, namely the position in which the output element 14b of the pivoting device 14 registers with the piston rod 17.

An important advantage of the improved driving unit is its simplicity. The toggle joint 8 is rugged and compact and can be installed between the members 4, 5 without unduly weakening the driving unit. Moreover, the toggle joint 8 can stand pronounced forces which tend to move the confining member 5 to the inoperative position 5' when the driving unit is in use. Still further, even though the toggle joint 8 can stand pronounced opening forces when the driving unit is in use, ah relatively small motor suffices to pivot the confining member 5 to the inoperative position 5' by the simple expedient of displacing the pivot 9 in a direction to move the pivot 11 nearer to the pivot 7. The toggle joint 8 is mounted at that side of the confining member 5 which is remote from the sockets 4c and 5b so that the toggle joint does not interfere with the loading or unloading of driven parts when the driving unit is idle and the confining member 5 is held in the inoperative position 5'. The toggle joint 8 performs the dual function of moving the confining member 5 between its operative and inoperative positions as well as of releasably holding the confining member 5 in the operative position. Since the illustrated confining member 5 constitutes or includes a wheel, it can be grasped by one or more hands to pivot its about the axis of the pintle 6 in a direction to confine a properly inserted driven part in the socket 4c of the driving member 1.

As can be seen in FIG. 1, the links 10a, 10 of the toggle joint 8 are located radially outwardly of the socket 4c and are remote from the axis A of the driving member 1. This increases the lever arm of the joint. The locking spring 15 constitutes a safety device which prevents unintentional pivoting of the confining member 5 to the inoperative position 5' under the action of centrifugal force upon the links 10a and 10. The axis of the pivot 9 can be located close or very close to the straight line which connects the axes of the pivots 7 and 11 when the confining member 5 is held in the operative position, and the axis of the pivot 9 can be immediately adjacent to such line between the line and the axis A so as to ensure that only a minimal counterclockwise pivoting of the confining member 5 in a counterclockwise direction (as seen in FIG. 1) about the axis of the pintle 6 is necessary before the links 10a, 10 reach their dead center positions while the pivot 9 moves radially outwardly toward the broken-line position of FIG. 1. The motor 16 overcomes the bias of the spring 15 and causes the spring to store energy during each stage of movement of the pivot 9 from the solid-line to the broken-line position of FIG. 1. A relatively small motor suffices to deform the spring 15, even if the spring is designed to offer a substantial resistance to movement of the confining member from the operative position, i.e., a resistance which invariably suffices to prevent accidental pivoting of the confining member 5 to the position 5' when the driving unit is in use.

Another important advantage of the improved driving unit is that the operator need not manipulate the toggle joint 8 by hand and/or by tools in order to change the position of the confining member 5. All the operator has to do is to initiate the operation of the motor 16 in a sense to increase the inclination of the links 10a, 10 relative to each other and, if desired, assist the movement of the confining member 5 to the inoperative position 5' by applying a force to the member 5 so as to pivot it clockwise about the axis of the pintle 6 (as seen in FIG. 1). As mentioned above, the motor 16 can be started in automatic response to movement of the driving member 4 to the angular position of FIG. 2 in which the output element 14b of the pivoting device 14 registers with the piston rod 17.

The feature that the axis of the pivot 9 can be located radially inwardly of the straight line connecting the axes of the pivots 7 and 11 when the confining member 5 is held in the operative position ensures that the action of centrifugal force upon the links 10a, 10 cannot result in a movement of the confining member to the inoperative position 5'. The reason is that it is necessary to first move the links 10a, 10 to the dead center positions against the opposition of the spring 15 and normally or often against the opposition of the driven part a portion of which is confined in the socket 5b. The initial bias of the spring 15 can be readily selected with a view to ensure that this spring can prevent accidental pivoting of the confining member 5 to the position 5' when the driving unit is in use, even if the axis of the pivot 9 is not located radially inwardly of the straight line which connects the axes of the pivots 7 and 11. As mentioned above, the action of centrifugal force upon the output element 14b (the major part of which is located at one side of the axis A as contrasted with the location of the links 10a, 10 at the other side of such axis) contributes to retention of the confining member 5 in the operative position when the driving unit is in actual use.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A driving unit for mandrels or other rotary driven parts, comprising a driving member rotatable about a first axis; a rotary confining member; a torque transmitting device provided on said driving member and defining for said confining member a pivot axis disposed at one side of and extending substantially at right angles to said first axis, said confining member being movable relative to said driving member between a first position of substantial coaxiality with said driving member and a second position in which its axis is inclined relative to said first axis; and means for moving said confining member between said first and second positions, including a toggle joint remote from said torque transmitting device and including a first link pivoted to said driving member, a second link pivoted to said confining member and to said first link, and means for pivoting said links relative to each other and relative to the respective members.

2. The driving unit of claim 1, wherein said confining member comprises a wheel and said driving member comprises means for transmitting rotary motion to a driven part, said motion transmitting means being accessible to permit disengagement of the driven part from the driving member in the second position of said confining member.

3. The driving unit of claim 2, wherein said toggle joint is located at the other side of said first axis, said confining member having a recess for a portion at least of said second link.

4. The driving unit of claim 2, wherein said pivoting means includes means for releasably locking said confining member in the first position.

5. The driving unit of claim 4, wherein said locking means includes means for yieldably biasing said links to positions corresponding to the first position of said confining member.

6. The driving unit of claim 2, wherein said toggle joint further comprises a first pivot connecting said first link to said driving member, a second pivot connecting said second link to said confining member and a third pivot parallel with said first and second pivots and connecting said links to each other, said third pivot being remote from and being disposed at one side of a line connecting the axes of said first and second pivots in the second position of said confining member and said third pivot being nearer to said line in the first position of said confining member.

7. The driving unit of claim 6, wherein said third pivot is located at the other side of said line in the first position of said confining member.

8. The driving unit of claim 7, further comprising abutment means provided on one of said members for preventing a pivoting of said links beyond the positions corresponding to the first position of said confining member.

9. The driving unit of claim 2, wherein said pivoting means includes an output element attached to said first link.

10. The driving unit of claim 2, wherein one of said links has an extension and said pivoting means comprises an output element which is pivoted to said extension.

11. The driving unit of claim 2, wherein said pivoting means includes a push-pull element which is pivoted to one of said links, said driving member having a chamber for said push-pull element and said pivoting means further comprising means for yieldably biasing said element in a direction to move said confining member to the first position by way of said links and means for moving said element against the opposition of said biasing means in a direction to pivot the confining member to the second position by way of said links.

12. The driving unit of claim 2, wherein said pivoting means includes a motor which is operable to move said confining member to the second position by way of said links.

13. The driving unit of claim 12, wherein said motor is a fluid-operated motor.

14. The driving unit of claim 12, wherein said pivoting means further comprises a reciprocable output element which is connected with one of said links and said motor includes a reciprocable component which is substantially coaxial with said element and is operative to move said element in a direction to pivot the confining member to said second position by way of said links.

15. The driving unit of claim 2, wherein said driving member has a chamber for said pivoting means and a retainer in said chamber, said pivoting means comprising a reciprocable push-pull element connected with one of said links and having a stop confronting said retainer, and a spring reacting against said retainer and bearing against said stop to urge said element in a direction to move said confining member to said first position by way of said links.

16. The driving unit of claim 2, wherein one of said links includes two sections flanking the other of said links, said toggle joint further comprising a pivot connecting said sections with said other link.

17. The driving unit of claim 2, further comprising a stationary support for said driving member, said driving member being rotatable relative to said support and said pivoting means including a first portion mounted on said support and a second portion mounted on said driving member, said second portion being in register with said first portion in a predetermined angular position of said driving member relative to said support.

18. The driving unit of claim 17, wherein said second portion includes a reciprocable push-pull element which is connected with one of said links and said first portion includes a motor which has a reciprocable component arranged to move said element in a direction to pivot said confining member to said second position, said element being substantially vertical and being located above said component in the predetermined angular position of said driving member.

19. The driving unit of claim 2, wherein said confining member has a recess for a portion at least of said second link, the cross-sectional area of said recess increasing in a direction toward said first link.

20. The driving unit of claim 1, wherein said driving member has a socket for a first portion of a driven part which is to be rotated thereby, said confining member having a portion which engages a second portion of the driven part the first portion of which is received in said socket in the first position of said confining member, said portion of said confining member being spaced apart from the second portion of the driven part the first portion of which is received in said socket in the second position of said confining member so that the first portion of such driven part can be withdrawn from the socket.

* * * * *